United States Patent [19]
Barnaby

[11] Patent Number: 6,052,149
[45] Date of Patent: Apr. 18, 2000

[54] METHOD AND APPARATUS FOR INTERLEAVING CHROMINANCE SIGNALS IN A VIDEO SIGNAL PROCESSOR

[75] Inventor: Catherine Louise Barnaby, Bristol, United Kingdom

[73] Assignee: SGS-Thomson Microelectronics Limited, Almondsbury Bristol, United Kingdom

[21] Appl. No.: 08/665,460

[22] Filed: Jun. 18, 1996

[30] Foreign Application Priority Data

Jun. 21, 1995 [GB] United Kingdom ............. 9512565

[51] Int. Cl.⁷ ..................................... H04N 7/12
[52] U.S. Cl. .................. 348/396; 348/384; 348/416; 348/715; 348/717
[58] Field of Search .................. 348/714–719, 348/845, 412–413, 415–416, 402

[56] References Cited

U.S. PATENT DOCUMENTS

| | | | |
|---|---|---|---|
| 5,448,372 | 9/1995 | Axman et al. ................ | 348/96 |
| 5,598,514 | 1/1997 | Purcell et al. ............... | 345/418 |
| 5,623,311 | 4/1997 | Phillips et al. .............. | 348/715 |
| 5,627,935 | 5/1997 | Kim ........................ | 386/81 |
| 5,638,128 | 6/1997 | Hoogenboom et al. ........... | 348/416 |
| 5,739,868 | 4/1998 | Butler et al. ............... | 348/584 |
| 5,761,423 | 6/1998 | Lee ......................... | 395/200.45 |

OTHER PUBLICATIONS

Richard C. Dorf, The Electrical Engineering Handbook, p.1868, 2082, Jan. 1993.

Primary Examiner—John K. Peng
Assistant Examiner—Dinh Cao Peter Chu
Attorney, Agent, or Firm—Wolf, Greenfield & Sacks, P.C.

[57] ABSTRACT

A video signal memory holds blocks of data representing luminance and first and second chrominance signals, the first and second chrominance signals being held in interleaved rows within the blocks, data being transferred from said blocks to a temporary store for use by a processor in predicting picture frames from the stored data.

17 Claims, 4 Drawing Sheets

Fig.2.
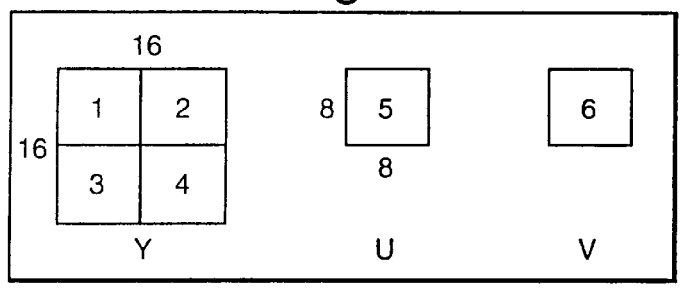
Fig.3.
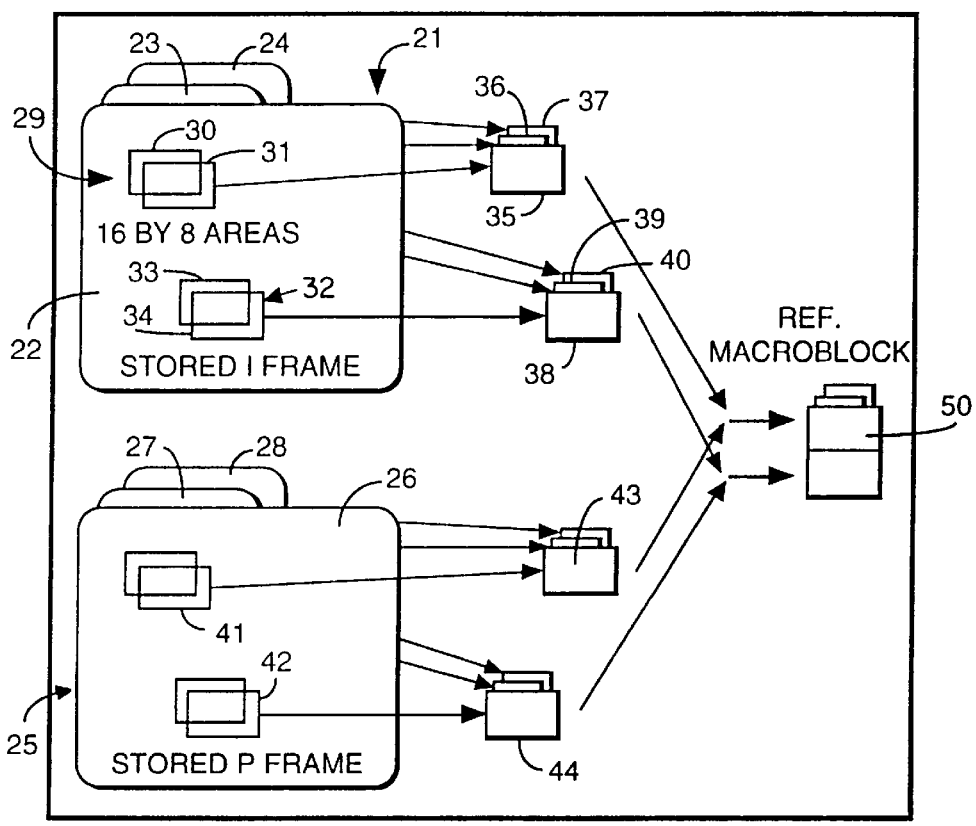
Fig.4.
| 0 | 1 | 2 | 3 | 4 | 5 | 6 | 7 | 64 | 65 | 66 | | | | |
|---|---|---|---|---|---|---|---|---|---|---|---|---|---|---|
| 8 | 9 | 10 | | | | | 15 | 72 | 73 | | | | | |
| 16 | | | | | | | 23 | | | | | | | |
| ⋮ | | | | | | | | | | | | | | |
| 56 | 57 | | | | | | 63 | 120 | | | | | | |
| | | | | | | | | | | | | | | | form
METHOD AND APPARATUS FOR INTERLEAVING CHROMINANCE SIGNALS IN A VIDEO SIGNAL PROCESSOR

BACKGROUND OF THE INVENTION

The invention is particularly applicable to video signal processing using compression and decompression and may be used with the MPEG video decompression system. In such a system a video signal generator forms video signals representing successive frames of an image and the signals are compressed by known techniques prior to transmission to a receiving station. At the receiving station the compressed signals are decompressed, for example by the formation of the Inverse Discrete Cosine Transform. The video data representing each image frame is provided by three separate channels. The first channel herein referred to as the Y signal is a luminance channel representing the luminance at full resolution of all picture elements in the frame. The other two channels are chrominence channels herein referred to as U and V channels respectively. These channels indicate colour difference signals for picture elements and the chrominence signals are provided at half resolution in each of the X and Y directions thereby resulting in quarter resolution for the whole frame. The decompressed data representing selected image frames is stored and used to predict video signal values for intermediate video frames. To calculate the predicted frames it is sometimes necessary to input data representing a selected area of the frame together with data representing the image half a picture element displaced from the selected area possibly in both the X and Y directions. The processor used to calculate the predicted frames may load data from a memory storing the frame video data into a temporary store and the transfer of data into the temporary store representing the selected area and the half picture element displacement from the selected area may involve a large number of data transfer operations into the temporary store.

It is an object of the present invention to provide improved video signal processing apparatus and method which can be used to simplify data transfers in processing video signal data.

SUMMARY OF THE INVENTION

The invention provides a video signal memory for holding luminance and first and second chrominance signals representing a frame of a video image, wherein said signals representing a frame are stored in block form in the memory, each block comprising a plurality of memory locations in successive rows holding picture data representing part of a frame in two perpendicular directions, each block which holds chrominance data being arranged to hold interleaved rows of both said first and second chrominance signals.

The invention also provides video signal processing apparatus comprising a video signal memory holding luminance and first and second chrominance signals representing a frame of a video image, wherein said signals representing a frame are stored in block form in the memory, each block comprising a plurality of memory locations in successive rows holding picture data representing part of a frame in two perpendicular directions, a processor for predicting picture frames from data in said video signal memory and a temporary signal store coupled to both said memory and to said processor for holding selected data transferred from the memory to the temporary store when required by the processor, said video signal memory being arranged so that each block which holds chrominance data holds interlaced rows of both said first and second chrominance signals, whereby data transfers from a block holding chrominance data to the temporary store includes interleaved rows of said first and second chrominance signals.

The invention also provides a method of loading video signal data into a temporary store of video signal processing apparatus, which method comprises storing in a video signal memory luminance and first and second chrominance signals representing a frame of a video image, wherein said signals representing a frame are stored in block form in the memory, each block comprising a plurality of memory locations in successive rows holding picture data representing part of a frame in two perpendicular directions, transferring data from blocks in said memory to said temporary store, each block which holds chrominance data being arranged to hold interlaced rows of both said first and second chrominance signals, whereby data transfers from a block holding chrominance data to the temporary store includes interleaved rows of said first and said second chrominance signals.

Preferably said method comprises transferring from said memory to said temporary store data representing two regions of said frame, said two regions being offset from each other by one picture element.

Preferably said two regions are offset from each other by one picture element in both of two perpendicular directions.

The invention includes a method of generating video signal data representing predicted picture frames from stored picture frame data, which method comprises transferring data from a memory to a temporary store as aforesaid and using transferred data representing two adjacent regions in said frame to predict data of a predicted frame.

BRIEF DESCRIPTION OF THE DRAWINGS

FIG. 2 illustrates a macroblock of video signal data used in the apparatus of FIG. 1, FIG. 3 represents data flow necessary for generating reference frame data in operation of the apparatus of FIG. 1, FIG. 4 illustrates arrangements of data blocks used in the memory of FIG. 1.

DESCRIPTION OF THE PREFERRED EMBODIMENTS

Figure 1:
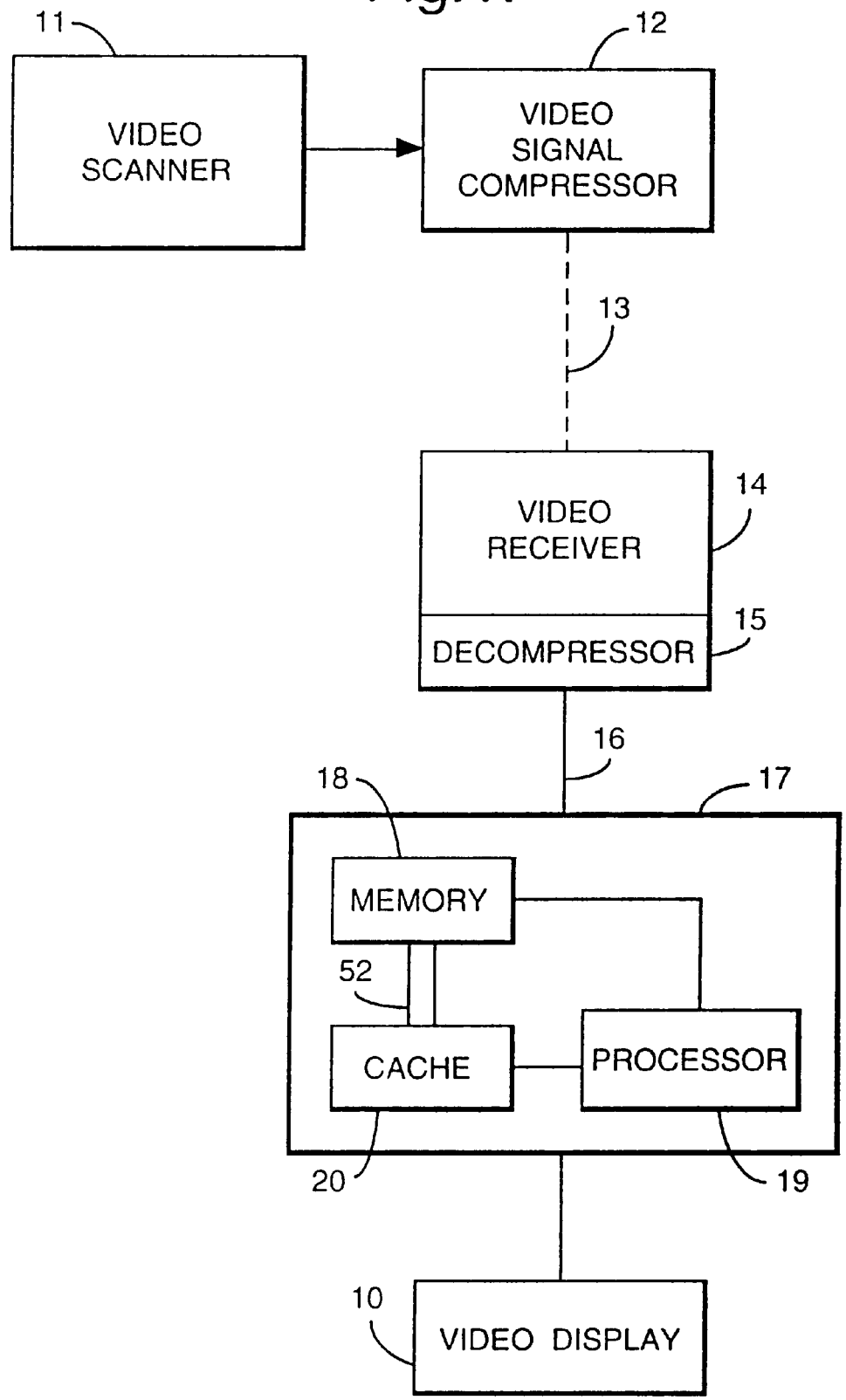
FIG. 1 is a block diagram of a video signal processing system in accordance with the present invention.

In the examples shown in FIG. 1, a video scanner 11 generates video signals representing an image in successive frames. The data representing each frame is compressed in a conventional manner by a video signal compressor 12. The compressed image is then transmitted over a path 13 to a video receiver 14 which includes a decompressor 15. The compression and decompression technique used in this example is conventional and may include the formation of an Inverse Discrete Cosine Transform by the decompressor 15 prior to output from line 16 of decompressed video signal data representing successive frames of the image. This example operates in accordance with the known MPEG video decompression system in which the decompression is carried out on blocks of data known as macroblocks each representing an area of 16×16 picture elements or pixels. Each picture element is represented by one byte (8 bits) of data. Each area of 16×16 picture elements is represented by data in three channels. A luminance channel has a Y signal at full resolution and two chrominance channels have U and V signals each at quarter resolution. This results in a macroblock of data as shown in FIG. 2. That macroblock has six separate blocks of data. Blocks 1, 2, 3 and 4 form a 16×16 data array representing the Y signal. Block 5 is an 8×8 array representing the U signal and block 6 is an 8×8 array representing the V signal.

Data representing a plurality of video frames is fed in succession along line 16 to a decoder 17. Each frame is represented by a plurality of macroblocks and the separate blocks of each macroblock are fed to the decoder on line 16 in accordance with the number sequence indicated on each block in FIG. 2. The data in successive blocks is loaded into a memory, 18 which is used to store data in block form representing a plurality of video frames. The decoder 17 includes a processor 19 and a temporary memory store in the form of a cache 20 and is arranged to generate reference data for use in generating intermediate frames for use between the frames for which data is recorded in the memory 18. This allows the generation of predicted frames from previous and/or forthcoming frames in a sequence of frames. To allow for motion compensation and other types of frame combination for use in generating reference frames, it may be necessary to combine data representing selected frame areas stored in the memory 18 with data representing half a picture element shift in both the X and Y directions. This allows fine control of image reference frames.

The flow pattern of data for use in creating reference macroblocks is illustrated in FIG. 3. Stored data representing a first frame is indicated at 21 and consists of a data array 22 representing the luminance Y channel and two smaller data arrays 23 and 24 each representing respective chrominance channels U and V. A second stored frame is illustrated at 25 where the luminance data forms an array 26 and the two chrominance channel arrays are marked 27 and 28. To form a reference frame, two selected areas are taken from each of frames 21 and 25. The data flow will be explained with reference to frame 21 although a similar data flow is taken from frame 25. Data is required from a first area 27 and a second area 28. As the system operates with interlaced lines in the video display, data is required for half block areas of 16×8 for the Y signal and 8×4 for the U and V signals. Due to the requirement, for data at a half picture element displacement, this means taking data representing a first 16×8 area 30 and a second 16×8 area 31 which is displaced by one picture element in both the X and Y directions from area 30. Similarly data will be taken from two 8×4 areas displaced by one picture element, for each of the chrominance planes 23 and 24. Similarly data is taken from two 16×8 areas 33 and 34 displaced by one picture element, for the region 28 with similar 8×4 areas taken from the corresponding chrominance planes 23 and 24. The data from the two areas 30 and 34 and corresponding areas of the chrominence planes are merged to form a signal luminance data array 35 with corresponding chrominance planes 36 and 37. Similarly for area 28, the signals are merged to form a signal luminance data array 38 and two chrominance arrays 39 and 40. Similar data is merged from area 41 and 42 in the frame 25 and merged to form data arrays 43 and 44 for each of the three channels Y, U and V. The merged data from area 27 of frame 22 is then merged with the data derived from area 41 of frame 25 in order to form part of a reference macroblock 50. Similarly data derived from area 28 of frame 22 is combined with data from area 42 of frame 25 in order to complete the reference macroblock 50. The reference macroblock consists of data of the format shown in FIG. 2 representing each of the Y, U and V channels but now constituting a reference macroblock for a reference frame derived from actual frames received through line 16.

To carry out the generation of the reference macroblocks 50, the processor 19 operates on block data that is transferred from memory 18 into the cache 20 over an interface 52. In order to operate efficiently and at high speed, the block data held in memory 18 is arranged to require minimum band width to the interface 52.

Data representing each frame is stored in memory 18 in a block format. This is shown in FIG. 4 wherein each 8×8 block consists of 8 rows each 8 bytes long. Each byte (8 bits) represents one picture element or pixel. In this example, the cache 20 will request a full cache line of data from the memory 18 whenever a cache miss occurs. In this example the cache 20 may have a cache line of 16, 32 or 64 bytes. In a preferred example the cache line is 32 bytes long. The memory interface 52 is 8 bytes wide so that 8 bytes are transferred in parallel on each memory access operation. To fill a 32 byte cache line it is necessary to carry out four memory access operations through the interface 52. For the merge function which has been illustrated in FIG. 3, it can be seen that for each merge operation it is necessary to read luminance signals for a 17 byte×9 byte area. The area may start at any pixel position so that the data may start at any byte in the memory 18. There are four such areas illustrated in FIG. 3 in order to carry out the merge operation. For chrominance data it is necessary to read data from a 9 byte×5 byte area and there are eight such areas used in FIG. 3 and these again may start at any pixel or byte position in memory.

Figure 5:
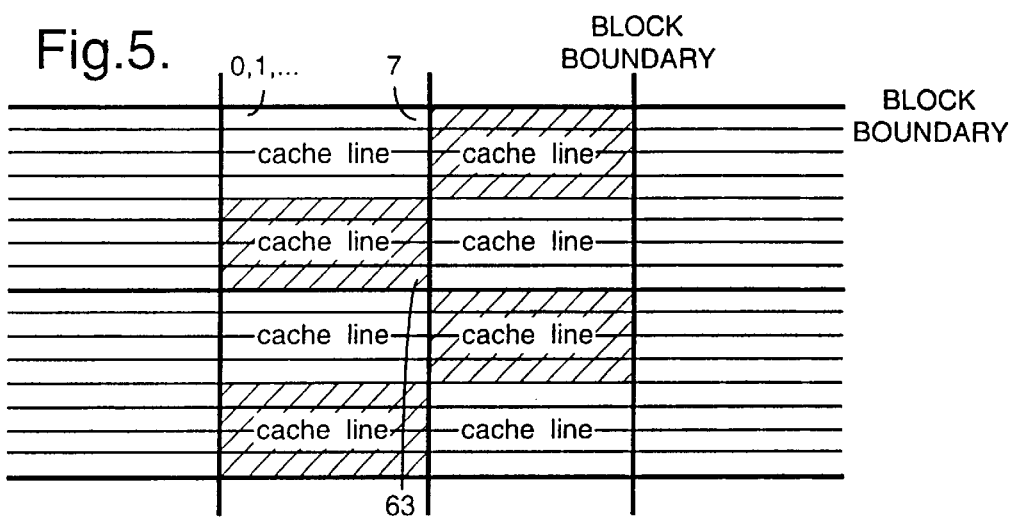
FIG. 5 illustrates the relationship between memory blocks and cache lines for use in one example of FIG. 1.
Figure 6:
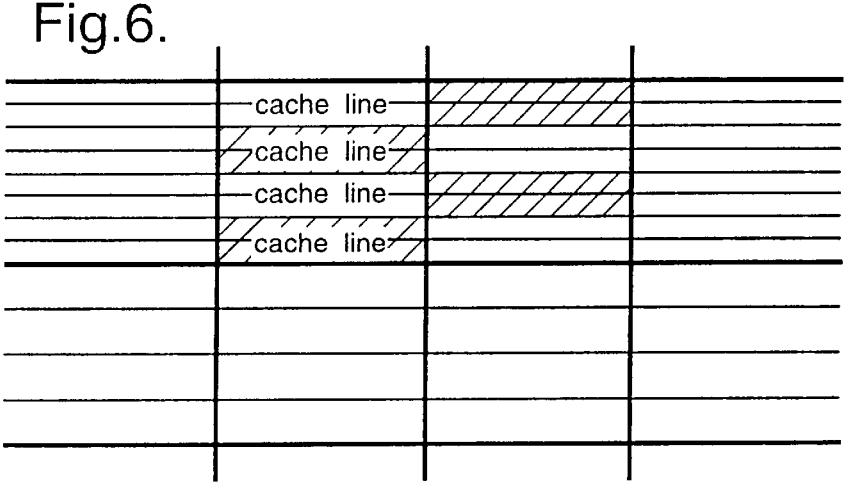
FIG. 6 illustrates an alternative relationship between memory blocks and cache lines which may be used with the apparatus of FIG. 1.

FIGS. 5 and 6 illustrate the correspondence between blocks of data in memory and how these blocks can be read into successive cache lines. FIG. 5 illustrates that for a 32 byte cache line four rows of each block will fill a cache line so that two cache lines are required for each block of data in memory. FIG. 6 illustrates that for a 16 byte cache line each cache line will hold the data from two rows of a block and four cache lines are needed to hold a full block of data.

Figure 7:
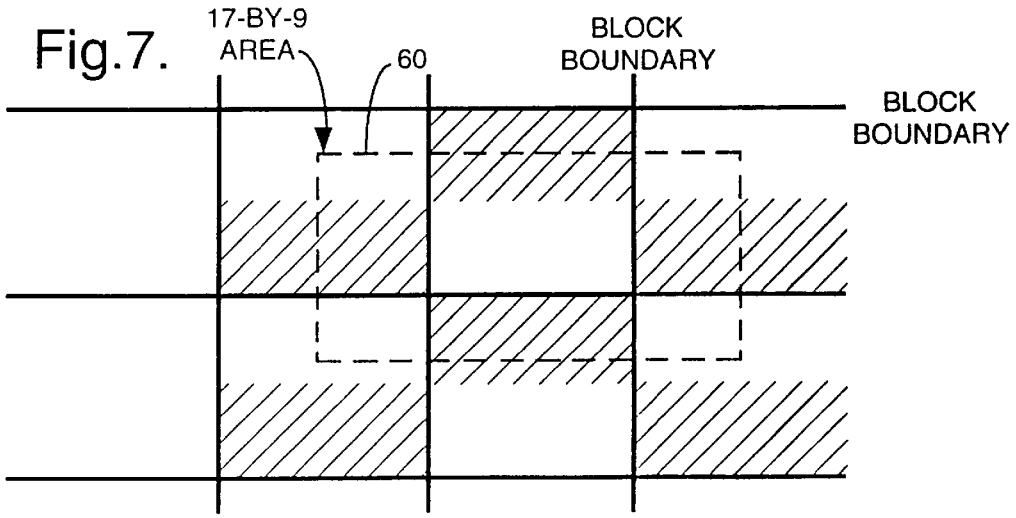
FIG. 7 illustrates the use of a selected area of memory storing a Y signal in use of the apparatus of FIG. 1.

FIG. 7 illustrates the position of filling 32 byte cache lines with luminance data where selected blocks in the memory contain only luminance data. As already explained a 17×9 area is required for transfer over the interface 52 and as can be seen from FIG. 7, the 17×9 area 60 may overlie three blocks of memory in the X direction thereby requiring three cache lines in the X direction. In the Y direction it will span three cache lines in depth such that in total it requires nine cache lines of data. A 64 byte cache line would require six cache lines of data to transfer data of the 17×9 area and a 16 byte cache line would require fifteen cache lines.

Figures 8, 9, 10, 11:
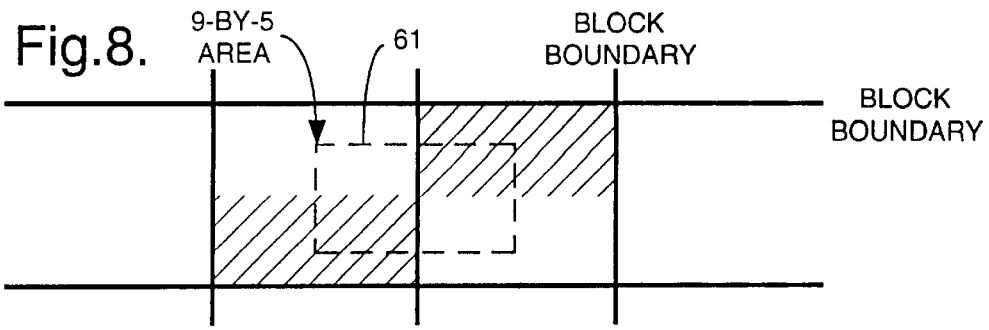
FIG. 8 illustrates the use of a memory area for storing U or V signals in the apparatus of FIG. 1.
FIG. 9 illustrates a memory location allocation for U data in the apparatus of FIG. 1.
FIG. 10 illustrates the allocation of memory locations for V data in the apparatus of FIG. 1.
FIG. 11 illustrates interleaving of Y U and V data in memory locations of the apparatus of FIG. 1.

The similar position for chrominance data is shown in FIG. 8. In this case data representing a 9×5 area marked 61 will for a 32 byte cache line span two blocks in the X direction and two cache lines in the Y direction so that four cache lines are needed to be filled for each of the chrominence blocks. A 64 byte cache line would require at most four cache lines of data and 16 byte cache line would require six cache lines of data.

The total number of cache line transfers required to merge four luminance areas of 17×9 and eight chrominence areas of 9×5 are shown in the following Table 1 for differing cache line sizes.

TABLE 1

| Cache line size (bytes) | Number cache line transfers (lum) Y | | Number cache line transfers (chr) U V | | Number cache line transfers (total read) |
|---|---|---|---|---|---|
| | per 17-by-9 area | total | per 9-by-5 area | total | |
| 16 | 15 | 60 | 6 | 48 | 60 + 48 = 108 |
| 32 | 9 | 36 | 4 | 32 | 36 + 32 = 68 |
| 64 | 6 | 24 | 4 | 32 | 24 + 32 = 56 |

It will be appreciated that the speed of operation is dependent on the number of cache line transfers that are required in order to read data from the memory in order to carry out the merge function. After the merge the results need to be written to memory and four 8×8 areas are written back for the luminance channel of each macroblock and two 8×8 areas are written back for the chrominence signals of each macroblock. The writing of these areas will start on a 64 byte boundary so that the number of cache line transfers required is much less than for the corresponding read operation. Table 2 shows the number of cache line transfers required for the write operation depending on the cache line size.

TABLE 2

| Cache line size (bytes) | Y Number cache line transfers (lum) per block | U V Number cache line transfers (chr) per block | line transfers (total write) |
|---|---|---|---|
| 16 | 4 | 4 | 16 + 8 = 24 |
| 32 | 2 | 2 | 8 + 4 = 12 |
| 64 | 1 | 1 | 4 + 2 = 6 |

The total number of cache lines read and written for the merge function and a typical time necessary to carry out the data transfer through the memory interface is shown by the following Table 3.

TABLE 3

| Cache line size (bytes) | Number cache line transfers (total read) | Number cache line transfers (total write) | Number cache line transfers (total) | time to read/write a cache line | total time ($\mu s$) |
|---|---|---|---|---|---|
| 16 | 108 | 24 | 132 | 140 | 18 |
| 32 | 68 | 12 | 80 | 200 | 16 |
| 64 | 56 | 6 | 62 | 330 | 20 |

Tables 1, 2 and 3 above indicate the position in which each block in memory contains only one of the signal values Y, U or V. However in accordance with the invention, data values representing the chrominence channels U and V are interleaved within a single block. This is illustrated in FIGS. 9 and 10. FIG. 9 represents data of one chrominence channel U and illustrates the byte positions within a block corresponding to the block format of FIG. 4. Similarly FIG. 10 shows the byte positions within a block of the other chrominence channel represented by signal V. It will therefore be seen that within any block representing chrominence values, the U and V signals are interleaved so that alternate rows represent alternatively U and V values. In this way, when read operations are carried out for a 32 byte cache line, each read will take data from four lines of a block but two lines will be of signal U and two lines will be of signal V rather than four lines of either U or V. This reduces the amount of data which is read into the cache but is not required for the particular block. When reading such interleaved chrominence data from the blocks in memory, a 9×5 area will now span a different number of cache lines. If the position in FIG. 8 is now considered where chrominence data is interleaved in alternate rows within the blocks, a 9×5 area will still span two memory blocks and therefore two cache lines in the X direction. However in the Y direction using a 32 byte cache line, the five lines of data will be covered in three cache lines as only two lines of data for each chrominence block will be within one cache line. However the three cache lines will give both the U and the V data. The total number of cache line read operations is now reduced from 32 as shown in Table 1 to 24 in the present case. Each 9×5 area requires six cache line reads and four such 9×5 areas are required for the merge. This reduction of eight cache line read operations compared with a total of eighty cache line read operations as shown in Table 3, reduces the memory band width requirement by 10%. A 64 byte cache line would require at most four cache lines of data for each 9×5 area of both U and V and a 16 byte cache line would require ten cache lines of data. The results of interleaving the chrominence signals within a block is shown from Table 4. The column dealing with total cache line operations required covers both read and write operations for both luminance and the two chrominence channels. The saving column relates to a comparison with the system of FIGS. 7 and 8 without interleaving the chrominence signals in the blacks.

TABLE 4

| Cache line size | Number cache line transfers for reading Cr and Cb data | | total cache lines read and write | time for data transfer $\mu s$ | saving (cache lines) | saving percent |
|---|---|---|---|---|---|---|
| | per area | total | | | | |
| 16 | 10 | 40 | 60 + 40 + 24 = 124 | 17 | 8 | 6.4 |
| 32 | 6 | 24 | 36 + 24 +12 = 72 | 14 | 8 | 10 |
| 64 | 4 | 16 | 24 + 16 + 6 = 46 | 15 | 16 | 26 |

It will be understood that the, decoder 17 calculates appropriate reference macroblocks for use in generating predicted frames which will be interleaved between future and previous frames received over the communication link 13 so that the output of the decoder 17 consists of a sequence of frames ready for display by a video display unit 10 connected to the output of the decoder 17.

The invention is not limited to the details of the foregoing example. In addition to interleaving the signals of the two chrominence channels, the data values representing the luminance channel may also be interleaved with the chrominence signals. Such an arrangement is shown in FIG. 11 which illustrates four blocks of memory two of which have been indicated with interleaved rows representing all three U, V and Y signals. By interleaving the rows of all three channels within the blocks of data in the memory 18, the cache line read operations will give increased efficiency in data transfer between the memory 18 and the cache 20 in avoiding transfer of data which is not needed in carrying out the merge function as previously described.

I claim:

1. A video signal memory for holding luminance and first and second chrominance signals representing a frame of a video image, wherein said signals representing a frame are stored in block form in the memory, each block comprising a plurality of memory locations in successive rows holding picture data representing part of a frame in two perpendicular directions, each block which holds chrominance data being arranged to hold rows of a first type storing the first chrominance signals, and rows of a second type storing the second chrominance signals, said rows of a first type being interleaved with said rows of a second type.

2. Video signal processing apparatus comprising a video signal memory holding luminance and first and second chrominance signals representing a frame of video image, wherein said signals representing a frame are stored in block form in the memory, each block comprising a plurality of memory locations in successive rows holding picture data representing part of a frame in two perpendicular directions, a processor for predicting picture frames from data in said video signal memory and a temporary signal store coupled to both said memory and to said processor for holding selected data transferred from the memory to the temporary store when required by the processor, said video signal memory being arranged so that each block which holds chrominance data holds rows of a first type storing the first chrominance signals, and rows of a second type storing the second chrominance signals, said rows of a first type being interleaved with said rows of a second type, whereby data transfers from a block holding chrominance data to the temporary store includes interleaved rows of said first and second types.

3. A method of loading video signal data into a temporary store of video signal processing apparatus, which method comprises storing in a video signal memory luminance and first and second chrominance signals representing a frame of a video image, wherein said signals representing a frame of a video image, wherein said signals representing a frame are stored in block form in the memory, each block comprising a plurality of memory locations in successive rows holding picture data representing part of a frame in two perpendicular directions, transferring data from blocks in said memory to said temporary store, each block which holds chrominance data being arranged to hold rows of a first type storing the first chrominance signals, and rows of a second type storing the second chrominance signals, said rows of a first type being interleaved with said rows of a second type, whereby data transfers from a block holding chrominance data to the temporary store includes interleaved rows of said first and second types.

4. A method according to claim 3 wherein said method comprises transferring from said memory to said temporary store data representing two regions of said frame, said two regions being offset from each other by one picture element.

5. A method according to claim 4 wherein said two regions are offset from each other by one picture element in both of two perpendicular directions.

6. A method of generating video signal data representing predicted picture frames from stored picture frame data, which method comprises storing in a video signal memory luminance and first and second chrominance signals representing a frame of a video image, wherein said signals representing a frame are stored in block form in the memory, each block comprising a plurality of memory locations in successive rows holding picture data representing part of a frame in two perpendicular directions, transferring data from blocks in said memory to said temporary store, each block which holds chrominance data being arranged to hold rows of a first type storing the first chrominance signals, and rows of a second type storing the second chrominance signals, said rows of a first type being interleaved with said rows of a second type, whereby data transfers from a block holding chrominance data to the temporary store includes interleaved rows of said first and second types and using transferred data representing two adjacent regions in said frame to predict data of a predicted frame.

7. A video signal memory according to claim 1 wherein each block holds interleaved rows of data, said interleaved rows comprising rows of luminance data, rows of first chrominance data and rows of second chrominence data.

8. Video signal processing apparatus according to claim 2, wherein said temporary store comprises a cache memory coupled to said video signal memory through a memory interface arranged to transmit a plurality of parallel bytes in each read or write operation to the cache.

9. Video signal processing apparatus according to claim 8 including video signal decompression apparatus having an input for receiving video signals in compressed format and an output connected to said video signal memory for supplying decompressed data in block format.

10. Video signal processing apparatus according to claim 9 wherein said processor is arranged to generate reference blocks of data derived from data in said temporary store and writing said reference blocks of data to said video signal memory.

11. Video signal processing apparatus according to claim 10 in which said video signal memory holds blocks of data in which luminance data is interleaved with rows of said first and second chrominance data.

12. A method according to claim 3 wherein luminance data is stored in said video signal memory in rows which are interleaved with rows of first and second chrominance data.

13. A method according to claim 3 wherein said temporary store comprises a cache and each read operation to load data into the cache is arranged to fill a cache line.

14. A method according to claim 13 wherein each cache line is arranged to hold data corresponding to a plurality of rows from a block in said video signal memory.

15. A method according to claim 3 wherein each block comprises an 8×8 byte array of data.

16. A method of generating video signal data according to claim 6 comprising generating reference blocks of data formed by merging data from a plurality of frame regions represented by data in said video signal memory.

17. A method according to claim 3 wherein data is merged from blocks within said video signal memory representing areas of a frame displaced from each other by one picture element to form a reference block of data and storing said reference block in said memory.

* * * * *

UNITED STATES PATENT AND TRADEMARK OFFICE
CERTIFICATE OF CORRECTION

PATENT NO. : 6,052,149
DATED : April 18, 2000
INVENTOR(S) : Catherine Louise Barnaby It is certified that error appears in the above-identified patent and that said Letters Patent is hereby corrected as shown below:

Column 3, line 53 through column 4, line 10 should read:

from frame 25. Data is required from a first area 29 and a second area 32. As the system operates with interlaced lines in the video display, data is required for half block areas of 16X8 for the Y signal and 8X4 for the U and V signals. Due to the requirement, for data at a half picture element displacement, this means taking data representing a first 16X8 area 30 and a second 16X8 area 31 which is displaced by one picture element in both the X and Y directions from area 30. Similarly data will be taken from two 8X4 areas displaced by one picture element, for each of the chrominance planes 23 and 24. Similarly data is taken from two 16X8 areas 33 and 34 displaced by one picture element, for the region 32 with similar 8X4 areas taken from the corresponding chrominance planes 23 and 24. The data from the two areas 30 and 31 and corresponding areas of the chrominance planes are merged to form a signal luminance data array 35 with corresponding chrominance planes 36 and 37. Similarly for area 32, the signals are merged to form a signal luminance data array 38 and two chrominance arrays 39 and 40. Similar data is merged from area 41 and 42 in the frame 25 and merged to form data arrays 43 and 44 for each of the three channels Y, U and V. The merged data from area 29 of frame 21 is then merged with the data derived from area 41 of frame 25 in order to form part of a reference macroblock 50. Similarly data derived from area 32 of frame 22 is

UNITED STATES PATENT AND TRADEMARK OFFICE
CERTIFICATE OF CORRECTION

PATENT NO. : 6,052,149
DATED : April 18, 2000
INVENTOR(S) : Catherine Louise Barnaby It is certified that error appears in the above-identified patent and that said Letters Patent is hereby corrected as shown below:

Claim 7 should read as follows:

7. A video signal memory according to claim 1 wherein each block holds interleaved rows of data, said interleaved rows comprising rows of luminance data, rows of first chrominance data and rows of second chrominance data.

Signed and Sealed this

Twenty-seventh Day of February, 2001

*Attest:*

NICHOLAS P. GODICI

*Attesting Officer*  Acting Director of the United States Patent and Trademark Office